(12) United States Patent
Tacklind et al.

(10) Patent No.: US 10,739,772 B2
(45) Date of Patent: Aug. 11, 2020

(54) TWO WHEEL IN-LINE ROBOTS

(71) Applicants: Christopher Andrew Tacklind, Menlo Park, CA (US); Cameron Andras Tacklind, Menlo Park, CA (US)

(72) Inventors: Christopher Andrew Tacklind, Menlo Park, CA (US); Cameron Andras Tacklind, Menlo Park, CA (US)

(*) Notice: Subject to any disclaimer, the term of this patent is extended or adjusted under 35 U.S.C. 154(b) by 0 days.

(21) Appl. No.: 15/214,258

(22) Filed: Jul. 19, 2016

(65) Prior Publication Data
US 2018/0024558 A1   Jan. 25, 2018

(51) Int. Cl.
*G05D 1/02* (2020.01)
*B62K 11/00* (2006.01)

(52) U.S. Cl.
CPC ............ *G05D 1/021* (2013.01); *B62K 11/007* (2016.11); *G05D 2201/0212* (2013.01)

(58) Field of Classification Search
CPC ........... G05D 1/021; G05D 2201/0212; B62K 11/007
See application file for complete search history.

(56) References Cited

U.S. PATENT DOCUMENTS

| | | | |
|---|---|---|---|
| 9,132,880 B2* | 9/2015 | Takenaka | B62K 21/10 |
| 2005/0121866 A1* | 6/2005 | Kamen | A63C 17/01 |
| | | | 280/47.18 |
| 2006/0065464 A1* | 3/2006 | Kofuji | B62K 25/283 |
| | | | 180/227 |
| 2008/0295595 A1* | 12/2008 | Tacklind | A61G 5/14 |
| | | | 73/462 |
| 2017/0084027 A1* | 3/2017 | Mintz | G06T 7/248 |

* cited by examiner

*Primary Examiner* — Jacob D Knutson
*Assistant Examiner* — Marlon A Arce
(74) *Attorney, Agent, or Firm* — Asif Ghias (57) ABSTRACT

A novel robotic platform is presented with the characteristics of only two wheels establishing a stable and unstable axis. Stability of the unstable axis is provided by controlling the steering while driving in the direction of the stable axis. Stability while stopped is provided by setting one or both of the wheels oblique to the stable axis and controlling the traction angle of the wheels. High control authority is thus provided while standing and while underway without sensitivity to the driving surface.

2 Claims, 12 Drawing Sheets

TWO WHEEL IN-LINE ROBOTS

This is a conversion to utility from a provisional of the same name filed 2015 Aug. 4.

This invention was not sponsored by any Federal R&D agencies.

No appendices are attached.

(headings in parentheses are headings only and not part of the submission)

BACKGROUND OF THE INVENTION

Fully autonomous vehicles are clearly on the horizon. Major companies are rushing forward with self-driving cars. The CEO of Uber has made it clear that they eventually intend to have fully automatic vehicles that deliver packages and humans. Is a vehicle that delivers a human a "car" or a robot? Still others consider using robotic contrivances to deliver packages. Notably, Amazon and others propose using robotic drones for delivery. Others are demonstrating small robots for to-the-door delivery.

DISCUSSION OF PRIOR ART

For many if not most applications, ground delivery is more efficient than air-borne delivery systems. In the drive to make package delivery cheaper and more effective, ground delivery will dominate. Hence ground robots will be pressed into service as delivery robots.

There is a plethora of robot configurations. The "Differential drive" is common for indoor robots on flat floors. They have difficulty on thresholds and any other floor imperfection. "Ackerman steering" is the arrangement common in cars. This works well in robots and is more forgiving on irregular surfaces. "Treaded" robots are often used in more severe environments. They are limited in their top speed and efficiency.

Like most robots, these are all limited in height. The primary characteristic dimension of a robot is the shorter of the wheel base length and wheel base width. Generally, the height is limited by this characteristic dimension. In more plain terms, tall robots need to be wide so that they don't fall over. The more extreme the terrain, the more the height is limited.

Balancing robots such as the now common "segway robots" get around this limitation by virtue of their "inverted pendulum" control dynamics. In particular, if a balancing robot is made 4 times taller, the rotational dynamics are half as fast, making the balancing servo control required half as fast. While clever, these all have a severe limitations in control authority while moving. In particular it is noted that servo motors have maximum torque at zero speed. So they have impressive control authority at zero speed. But as the speed increases, the torque available drops. So as a balancing robot speeds up, it loses control authority. In particular, the only way for a balancing robot to slow down is to get the wheels out in front of the center of mass. So if the maximum speed of the motors is reached, there is no control authority. In plain terms, it falls down.

Segway robots have an additional limitation in "roll". In particular, the characteristic dimension of the wheel spacing limits the height if the ground surface is not level side-to-side. Some versions add an additional degree of freedom to correct for roll displacement of the center of mass, but this adds complexity and puts additional limits on the roll stability.

The prior art does include two in-line wheeled vehicles that are stabilized by using torque from a large mechanical gyroscope. These are heavy archaic vehicles are collectively known as Gyrocars. Ford Motor Company produced sample Gyrocars in the 1960s. Other art describes a wide variety of automatic kick stands and training wheels to catch the vehicle as it stops.

SUMMARY OF THE INVENTION

The invention at hand exploits modern controls, sensors and actuators to realize a novel family of in-line two wheeled vehicles (Twills) as robots. An earlier filing covered some Twill robotic applications but mostly covered vehicular Twill applications. These two wheel in-line vehicles are ideally suited for a wide variety of applications beyond humans driving a Twill. As these vehicles become more ubiquitous and automatic, they will inevitably be used to deliver humans.

DETAILED DESCRIPTION OF THE INVENTION (FileBot)

Figure 1:
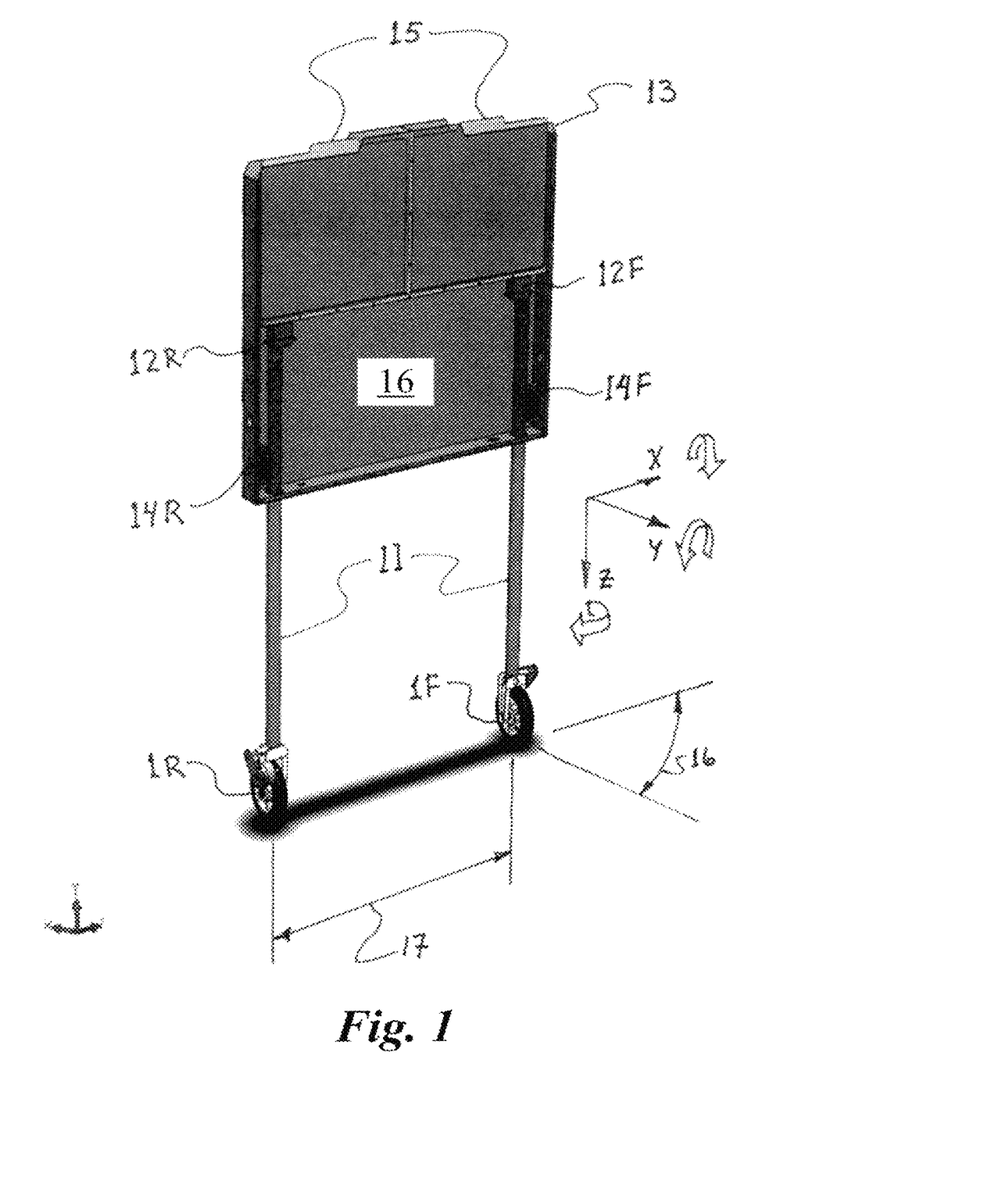
FIG. 1 shows an oblique view of a Twill bot demonstrator for delivering manila folders.

We assert that twill robots are suitable for a wide variety of tasks. A major category is the task of ground delivery. As an example of this utility we have reduced to practice a simple delivery robot that delivers manila folders (15). To accentuate the novel features of this robot, we fabricated this demonstration as a double size manila folder (13). FIG. 1 shows such a "fileBot" standing with its wheels (1F, 1R) turned sideways. A volume (16) is provided for electronics, sensors, motors and batteries.

In this preferred embodiment, the fileBot has two identical legs (11) disposed as far apart from each other as is practical. Each leg is fitted with a turning servo (12F, 12R) that acts to twist the leg relative to the body (13) and a torque motor (10) that drives the wheel at the bottom of the leg. In another preferred embodiment, only one leg may twist and only one wheel has a torque motor. In the preferred embodiment shown, the contact point of the wheel is on axis with the axis of rotation of the leg. An offset of this contact point is known as trail. For the purposes of this first demonstrator, the trail adds unneeded complexity to the equations. Likewise, making the steering angle non zero is common, but not needed for this simple demonstration.

(Segway Style Balance)

In this stance the fileBot balances just as a Segway robot does. Though limited in speed, it has considerable control authority at low speeds. Balancing a fileBot near zero speed is now commonly practiced by persons skilled in the art. It has literally the dynamics of an inverted pendulum. The control law is fundamentally a "PID controller" around the pitch axis. That is, the wheels move forward and aft relative to the center of mass in an attempt to keep the contact point on the ground substantially under the center of mass. The estimate for pitch and first derivative of pitch are readily supplied by modern accelerometers and rate gyros. "Sensor fusion" is typically achieved by use of a Kalman filter or simpler digital filter.

This fileBot demonstrator incorporates half a dozen optical range finders (14F, 14R). So it is possible for the fileBot to align itself parallel to a wall. This is particularly handy for parking. A fileBot can readily roll up to a wall and with a tiny flick of the wheels, fall over a small amount to come to rest against the wall. The reverse is also true. By rolling into the wall, enough angular momentum is generated to pull the fileBot away from the wall. At the next moment, the balancing algorithm is activated arresting the pitch and holding the pitch angle at zero. A wide variety of other sensors are also applicable.

(Segways Crash from being Wide)

A fileBot moving in this Segway manner will be impressive enough. But as it moves in this manner it has a very wide stance. This is a rather poor choice for moving through a cluttered environment. Like any Segway robot, it would suffer considerably as the speed increases. If one edge clips a stationary object it is certain to crash to the floor.

(Pitch Definition)

Note that in the discussion above, pitch was defined relative to the "segway like" motion with the wheels turned transverse to the body of the fileBot. The motion of a fileBot is much more interesting along the axis of the long dimension. Defining this as the X direction it is convenient to define X, Y, and Z, and pitch, roll, and yaw in the conventional sense. The challenge in balancing a fileBot while moving in the forward X direction is to stabilize the roll angle. Note that for the most part, no stabilization is needed in pitch as the characteristic dimension (17) of the spacing of the wheels provides pitch stiffness along the X direction.

(Forward Motion)

In this forward motion case, the dynamics are still that of an inverted pendulum. That is, the challenge is to stabilize the roll by moving the contact point in the Y direction relative to the center of mass. This must happen while the X position is steadily increasing.

Note that using the torque motors as in the Segway sense, only puts ripple in the X velocity. It has little to no affect on the roll angle. Instead, we effect roll by commanding a non-zero steering angle (16). Since the forward momentum is used to effect this roll behavior, the control authority increases with forward speed.

(Two-Wheel Steering)

For these experiments it is worth considering steering the wheels together. This keeps the X direction substantially constant instead of introducing yaw motion. For a particular velocity, a small steering angle will cause the contact patch of the wheels to creep out from under the fileBot. The Roll rate is then directly proportional to the forward velocity and the steering angle.

(Slope of Steering)

More precisely, it is the "slope" of the steering angle that is the relevant number. For a given forward velocity, doubling the steering angle slope will double the roll rate. For the PID controller one skilled in the art will readily find suitable gain constants commanding the slope in proportion to the roll and roll rate ("PD controller"). Further note that if the forward speed is cut in half, the steering slope needs to double to create the equivalent control influence. By extrapolation we get the natural result that as the speed goes to zero, the steering slope goes to infinity. This is exactly the Segway condition. This example provides a first preferred embodiment of the control law that spans from forward motion to a fixed stance.

(Other Control Methods. Segway Mode)

As the development of Twills advances, many variants of the control laws will be employed. Take for example the control law for standing still in the Segway mode. In this stance, the steering motors may hold the wheels perpendicular to the body. Then the challenge is to command torque to the traction motors in response to the roll angle and roll rate. In a preferred embodiment, the side-to side displacement distance Y and rate of change of Y are also taken into consideration. One is tempted to use, a control law where the wheel torque is proportional to these four variables. Numerous simulation examples are available of this technique. Many sophisticated analysis techniques are also available. Even methods for algorithmically generating the proportionality constants are readily available. In practice however, one needs to deal with practical limits such as back lash, noise, and saturation of the actuators. Failure to account for these leads to erratic behavior and quickly to complete failure of the balancing function.

(Multiple Loops)

So it is often preferable to brake the problem into simpler independent loops. In a preferred embodiment, a fast servo loop may be formed controlling the position of the wheels in the Y direction. This is readily formed by a PID loop on the sensed position of the wheels. This control may have any selected dynamic behavior from snappy to sluggish. It is common practice by those skilled in the art to optimize for minimum settling time. In as much as this commanded position is fast compared to the roll dynamics, it can be considered to be instantly available. So in this preferred embodiment, the Y position may be commanded in direct proportion to the roll angle and roll angle rate. Adding an integral term results in the common PID construct. Now suppose we desire the Y position to be zero. All we need to do is form another PID loop on Y which commands the roll angle. This is how it comes about that "to move home you need to lean to home. To lean to home you must drive away from home." Still other loops may be added to account for sensor drift.

(Forward Motion Servo)

Note that in the "slope of steering" teaching above, a servo loop was used to control the steering angle while driving. In a preferred embodiment, a control loop on side-to-side motion may be formed again, controlling the Y position. That is, if a 0.1 m step is commanded, the slope is commanded to increase and then decrease as the correct position is achieved. Note that the computation of the Y position also takes into account the forward velocity. That is, if you are going twice as fast, you get to the required Y displacement twice as fast. As in the Segway mode, we can now consider the Y value as fast compared to the roll error. So we again command the Y position in response to the Roll error forming a PID controller for the roll. In a preferred embodiment, additional loops may be imposed as needed. Note that in this second preferred embodiment the control law for forward motion is essentially identical to the control law for Segway mode. In preferred embodiments the transition from one mode to the other may be given special consideration.

(Crucial Benefits)

This use of the forward momentum is a crucial benefit of the invention. It is this feature of the invention that results in high control authority at working velocities. The invention further requires the transition to balancing while stopped. The invention also requires the transition from balancing to forward motion. This is also the crucial feature that allows twill robots to be tall compared to the wheel base dimension. This feature also allows twill robots to be narrow compared to their wheel base. This feature results in lack of sensitivity in roll angle of the surface.

(Other Transitions)

Further work will reveal many other choices for this transition. We know by example, that a rider on a "fixie bicycle" sets the steering angle at about 45 degrees, a slope of just 1. This may be optimal, convenient, or just an artifact of the fact that the front wheel is not powered on a bicycle.

(Front Vs Back)

Please note that the use of "front" and "rear" is purely for discussion clarity. In fact, twill robots may or not be symmetric front to rear. In a preferred embodiment the front and rear steering and traction motor assemblies are identical. This reduces part count and simplifies other considerations such as the control laws. For example, if only one wheel steers, then the twill bot cannot enter into a true Segway mode. With one wheel turned and the other fixed the bot is in a "half Segway" mode. With minor adjustments to the algorithm this balances much like a Segway.

(Wide Wheels)

Generally we think of a wheel as touching in a single point. In practice, a wheel may touch in a considerable round or oval patch. These offer a small bit of stability while stopped on a hard surface with little to no roll. The same can be said for a pair of wheels that are rather close to each other. Even without articulation, such essentially wide wheels may be used with the balancing invention presented herein.

(Turning)

Similar algorithms will be required for steering through a commanded path. The variety of solutions is rich. In a preferred embodiment, the front wheel only is steered, much like a bicycle. In other preferred embodiments, both wheels steer together or in proportion to each other. It is also possible to drive in Segway mode. Remarkably, it is possible to drive in any direction oblique to the stiff axis and to continuously vary this axis.

(Hockey Stop)

In a preferred embodiment, when a transition is required from forward motion to stopped, one or both of the steering angles may be abruptly commanded to 90 degrees. This may result in a sideways slide of the wheel or wheels much like the common "hockey stop" known to ice skaters. Indeed, this may be a universal transition method if one specifies a minimum speed at which to command the stop. While sliding and when stopped, any resulting roll error is handled as a disturbance input. This must be kept within the dynamic capabilities of the servo loops. An open-loop pre bump may be employed to help mitigate the disturbance of the transition.

(Other Motor Configurations)

It will be clear to one skilled in the art that various combinations of one wheel steered or two wheel steered or one wheel powered or two wheels powered. Indeed there are other applications with more than two wheels in line forming an articulated chain.

(Steering, Encoders)

A natural mechanism for the steering is a fork and headset as is common on bicycles. This is readily driven by an arrangement of direct-drive motors, gears, belts, or pulleys as are common in the art. Steering angle is readily encoded by any of the technologies in common use such as magnetic, optical, or others known to one skilled in the art.

(Non Zero Trail, Non-Zero Steering Angle)

A feature of the bicycle steering mechanism is the freedom to select the steering angle and trail distance. This geometry has an effect on the handling and stability of a bicycle and Twill robots. Future investigation will yield a variety of geometries suitable for each application. In the context of bicycles this is still an active area of academic investigation. In Twill robots, certain geometry selections will reduce control energy and smoothness of motion.

(Steering Trail for Balancing) In a preferred embodiment substantial trail distance on one or both of the steering axes may be used to effect balance control while stopped without using the traction motors. An extreme version of this is to have a substantially central hinge that serves as the steering axis.

(Four-Bar Steering)

Figure 3:
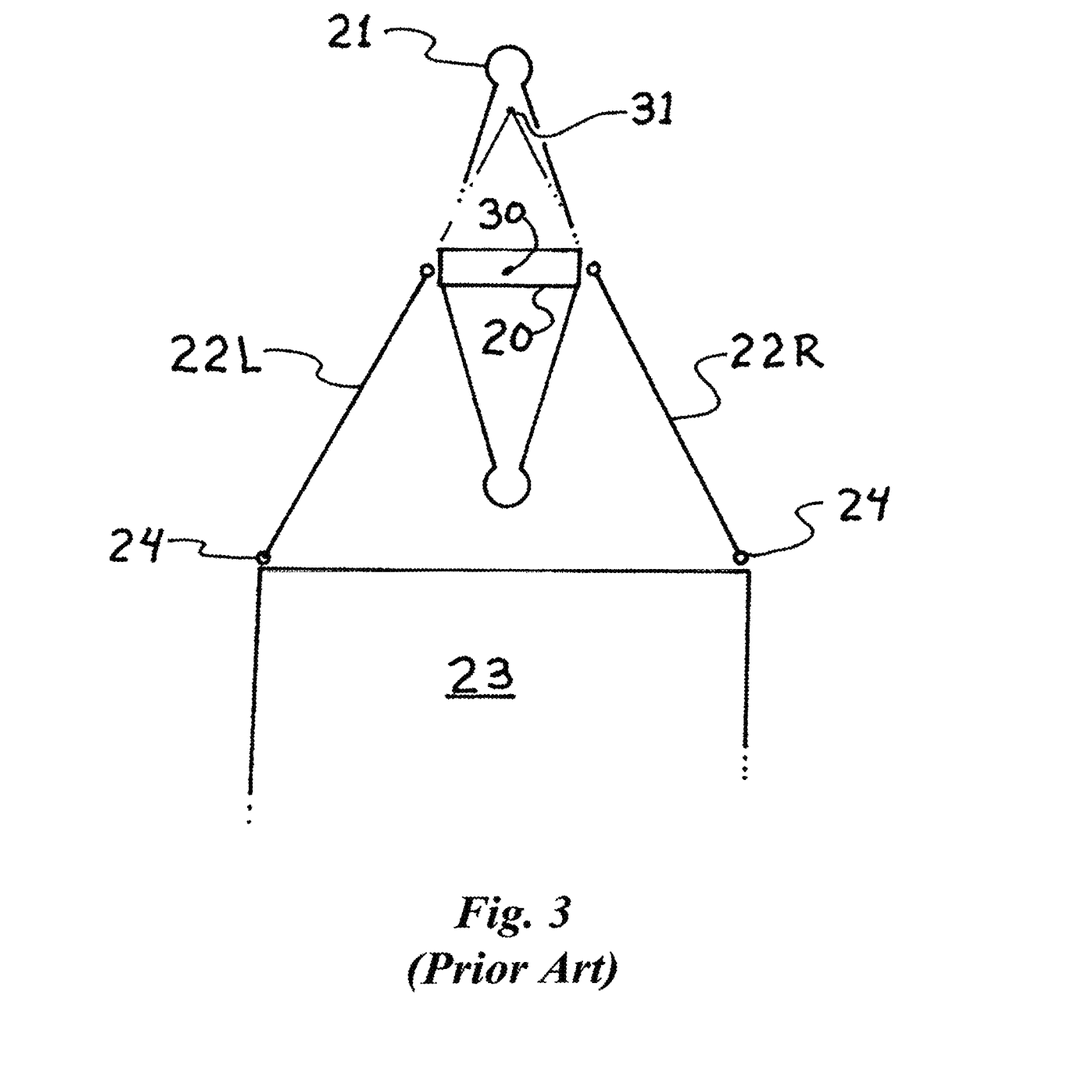
FIG. 3 shows a top view of the prior art steering mechanism indicating the instant center concept.

An interesting steering geometry was used on some early motorcycles. This method employs a four-bar mechanism. The key motivation for this mechanism is to keep the mechanism compact and generally lower than the top of the wheel. A schematic view of the mechanism as historically practiced is shown in FIG. 3. Note that the linkages (22R, 22L) generally connect on the axel (20) of the wheel (21). At the rear end the linkages connect to the body (23) with rotational joints. Rod end bearings (24) are commonly used for these joints.

(Zero Positions for Steering, Roll Etcetera.)

In developing the four-bar steering mechanism for Twill robots, it has become clear that there is a richness to the mechanism that has not yet been exploited. To one experienced in the art of four bar linkages, it is natural to exploit the instant center of the mechanism. As shown in FIG. 3 this point (31) is at the intersection formed by the lines defined by the moving links (22). This is shown schematically in the top view FIG. 3. This point has the unique property that if the contact point of the wheel (30) is located there, then steering input results in a pure rotation about this point. This is only true for small motions, but is often adequate for practical purposes. In FIG. 3 the contact point (30) is shown considerably behind the instant center (31).

(Caster in Four Bar Linkage)

Figure 4:
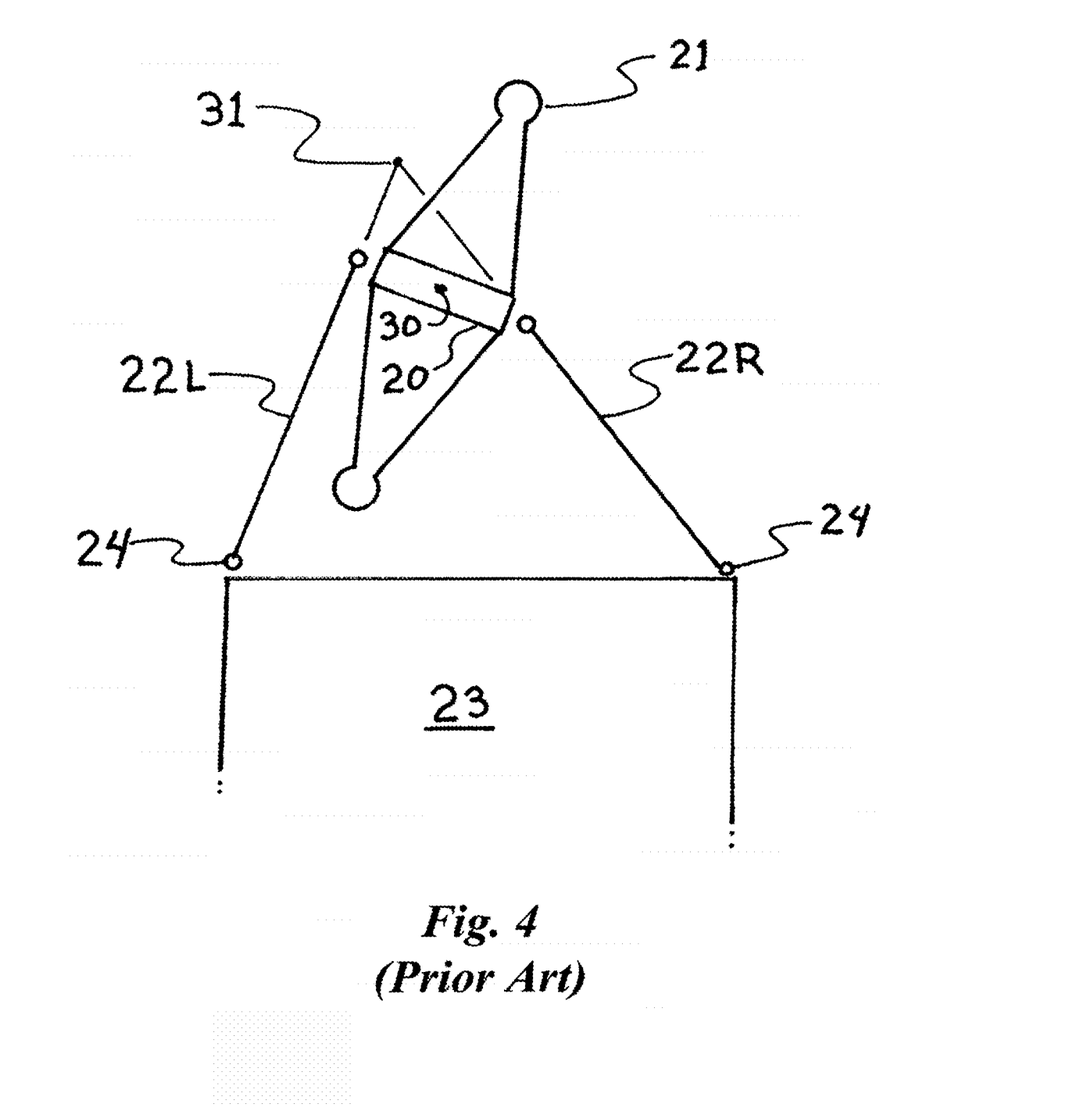
FIG. 4 shows a top view of the prior art with a non-zero steering angle.

While the above is a natural choice and suitable for some preferred embodiments, it has an unfortunate property of being unstable in forward motion. From FIG. 4 we see that for any non-zero steering angle, the forward motion force on the wheel produces a torque on the steering mechanism which acts in a direction to increase the steering angle. This could lead to inherent steering instability. This is equivalent to a negative caster distance on a castered wheel. This could be stabilizes by a suitably stiff control system. This instability is diminished, but remains if the contact point is placed below the midpoint of the moving linkage (as is seen in historic examples). In practice, moving back from the axel as much as the instant center substantially eliminates the negative caster.

(Caster Effects)

In each of the cases above, the control law needs to take into account the effect of moving the wheel off axis. That is, with any non-zero caster, moving the contact point of the wheel off axis changes the zero roll angle position. This is readily accounted for in the control software.

(Suspension, Compact)

The four-bar arrangement results in a compact potentially self-contained package. In a preferred embodiment this module contains the drive motor, steering motor and drive electronics. This greatly enhances field serviceability. In a preferred embodiment, the package is mounted in a mount that allows translation or rotation. Adding a spring damper externally to the module creates a suitable suspension system.

(Hydraulic Synchronization)

Figure 5:
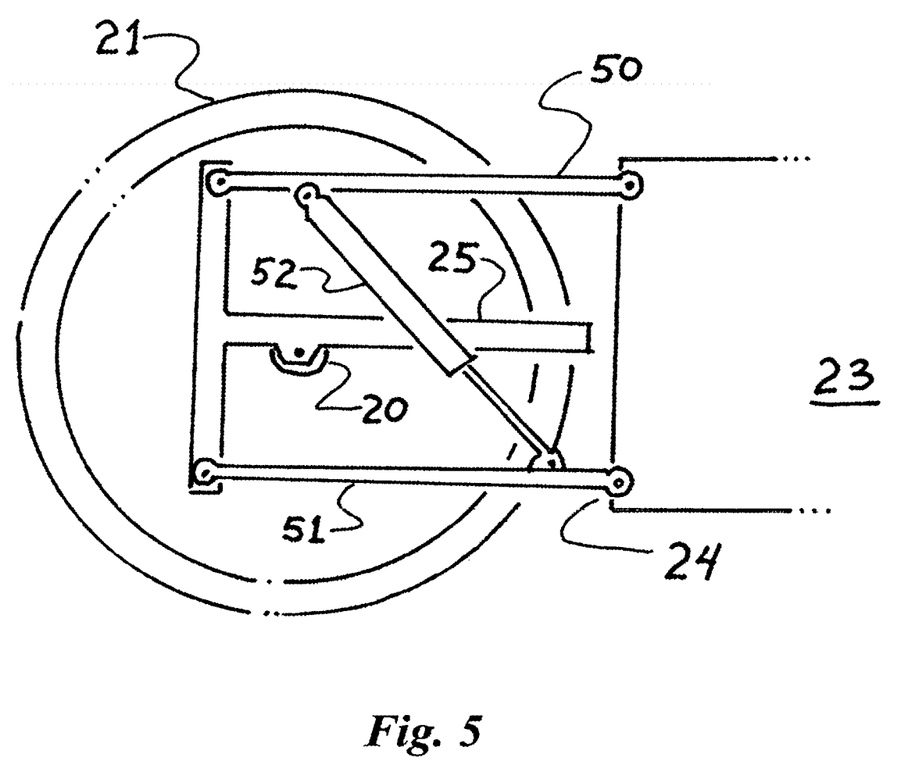
FIG. 5 shows a side view of a novel extension of this steering mechanism with hydraulic synchronization.
Figure 6:
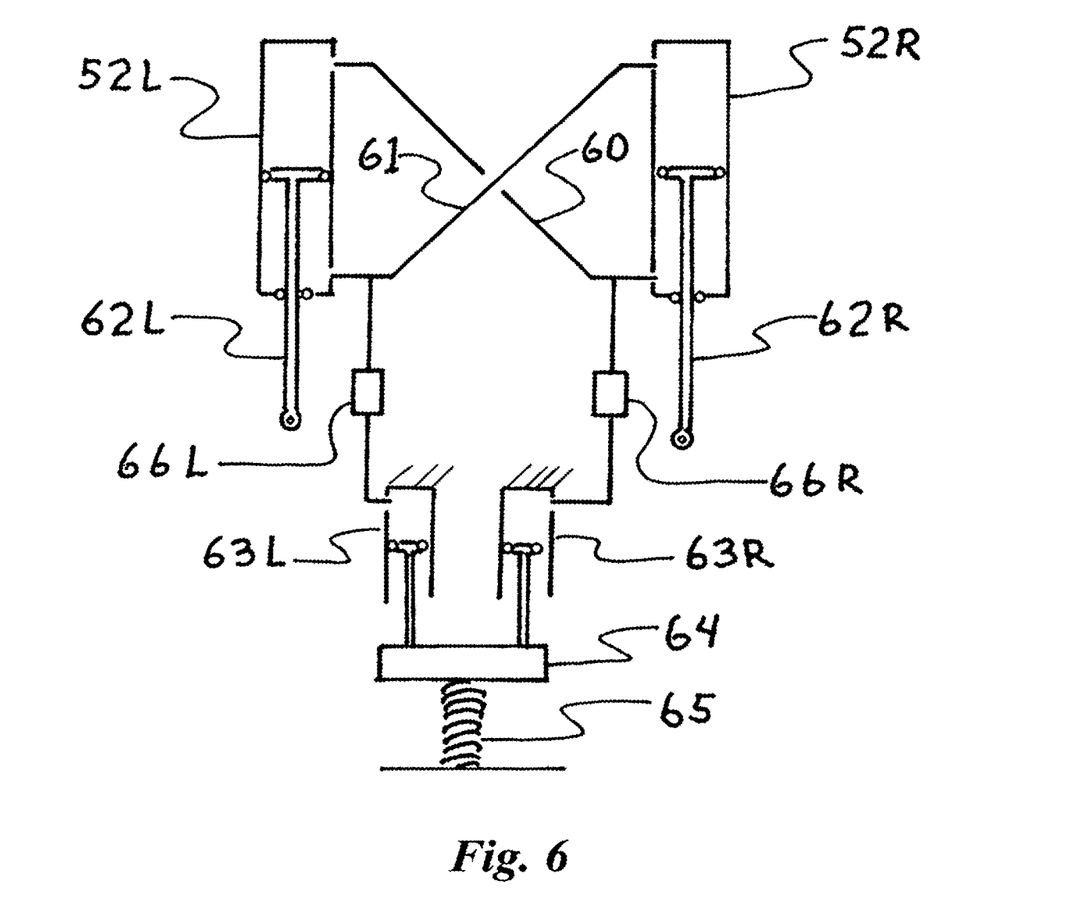
FIG. 6 shows the interconnections between hydraulic cylinders to produce synchronous motion and damping.

In another preferred embodiment, the dual arms of the four-bar linkage (50, 51) suggest a location for suspension elements (52) as suggested by FIG. 5. Unfortunately, this embodiment still requires a means for synchronizing the motion of both arms. A novel way to accomplish this is to use hydraulic synchronization as shown in FIG. 6. This is achieved by cross connecting a pair of double-acting hydraulic cylinders (52L, 52R) with hydraulic hoses (60) and (61). So if one cylinder moves, the other must move precisely the same distance thus synchronizing the two sides of the linkages. As is common with hydraulic cylinders, the cross sectional area on each side differs by the area of the piston shaft (62). Thus, motion of the piston results in a change in volume. This is readily accommodated by a pair of auxiliary cylinders (63) that capture the difference. Coupling these together with plate (64) preserves the synchronization. In a preferred embodiment, preloading the pair of auxiliary cylinders with an external spring (65) provides the suspension spring function. A flow restrictor (66) on the hydraulic lines may be selected to give the desired damping forming a high performance suspension system. Note that all of this is readily contained in the module further enhancing field serviceability.

(Knee Jerk Steering)

Figure 2:
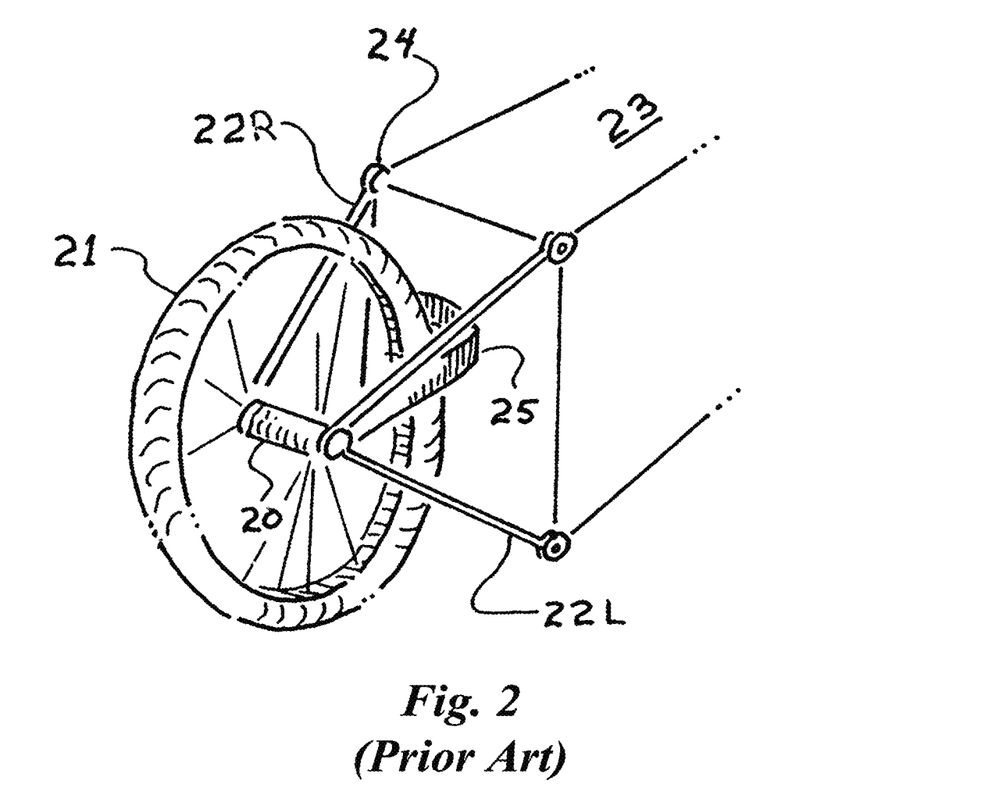
FIG. 2 shows an oblique view of a compact steering mechanism as practiced by the prior art.

The steering fork, (25) in FIG. 2 is used in the four-bar steering to point the wheel in the correct direction. This may be done by any of the conventional means known to one skilled in the art. These include but are not limited to electric motor with a crank or a belt drive.

(Steering Fork Motion)

This is a bit tricky if the suspension allows the fork to go up and down. In one preferred embodiment a pair of hydraulic cylinders are used. Through hydraulic connections similar to the hydraulic synchronizer, the commanded relative position may be kept constant. Thus, as the fork goes up and down, the commanded angle can be kept substantially constant.

(Crossed Arms Eliminates Fork Motion)

Figure 7:
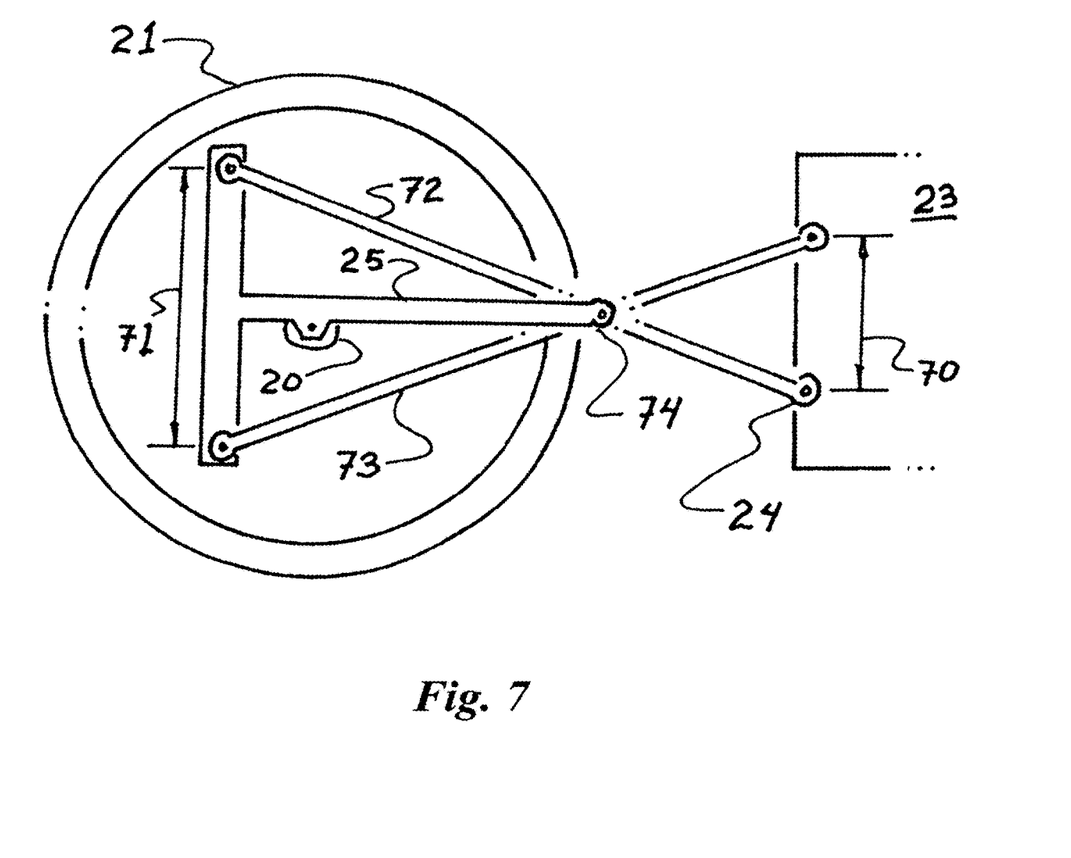
FIG. 7 shows and improved embodiment that substantially eliminates bump steering.

In a novel four-bar application, the vertical parallelogram motion is replaced by a four-bar linkage. Generally, the spacing of the ends (70, 71) may be selected for any desired behavior. The instant center of the wheel assembly is again where the two lines cross. So in this case a preferred embodiment is to cross the arms as shown in FIG. 7: With the linkage dimensions (72, 73) selected so that the cross is near the attachment point (74) of the steering fork, the vertical motion has minimal impact on the attachment point. This substantially reduces bump steering.

(Hydraulic Steering)

Hydraulically assisted steering is common in automobiles. Hydraulic steering is common in construction equipment and boats. These would both seem excessively complicated for a twill robot. A novel implementation has remarkable simplicity. First note that with one or two hydraulic actuators for steering, the steering position is commanded by pushing fluid into the correct chamber while draining the other. This is normally done from a pressurized hydraulic source. Instead consider moving the fluid directly with a small gear pump that can move fluid directly in one direction or the other. A very small gear pump, and large diameter cylinders is exactly equivalent to selecting a gear ratio in a more conventional steering train. A careful selection results in a gear free design.

In many systems this would seem crazy, since the gear pump will have a bit of blow-by causing position drift. But in the Twill robot, the steering position is continually monitored and the position updated with a servo loop.

(Kneeling and Kick Stands)

All of the foregoing has been accomplished without the use of kickstands or training wheels. There are preferred embodiments where kickstands or the equivalent may be included. In one preferred embodiment, the suspension system spring is an air chamber compressing the hydraulic differential. Relieving the pressure allows the suspension to relax dropping the robot to the ground. This is similar to the system used on Citroen cars in the 1970's. This is of particular utility in delivery robots that effectively "kneel" to be loaded or unloaded.

(Tall Thin Delivery Bot)

Figure 8:
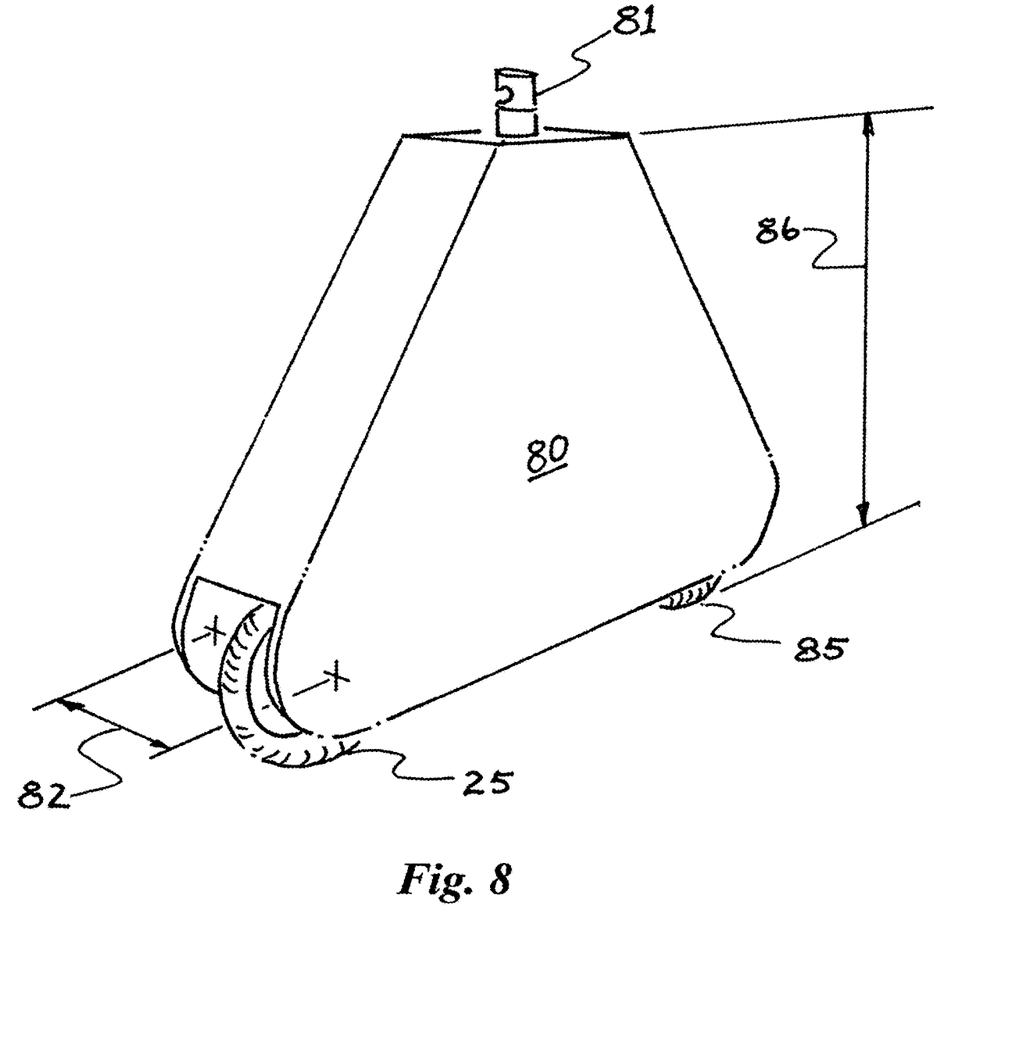
FIG. 8 shows a Twill delivery robot suitable for on-road use.

All of this comes together to form a preferred embodiment of a delivery robot. As with the other Twill robots it has front and rear in-line wheels (25, 85). The tall stance (86) allows them to be as tall as cars on the road. They may have a narrow dimension (82), to allow lane splitting and driving on the side of the road. In FIG. 8 the profile (80) is shown as a frustrated triangle, but any shape may be used. This thin embodiment is particularly well suited for delivery of boxes. At this time, a sensible internal width is only 16 inches as the largest standard Amazon box is only 16 inches wide. This makes the delivery bot suitable for driving on sidewalks, through doors, and in freight elevators.

It is also noted that in a preferred embodiment large diameter wheels are used. This allows traverse of curbs and even stairs. As a practical matter, the choice of large diameter wheels reduces demands on the wheel bearings, provides for long lived tires. This simplicity results in a vehicle capable of a long service life with minimal maintenance.

(Arms)

Figure 9:
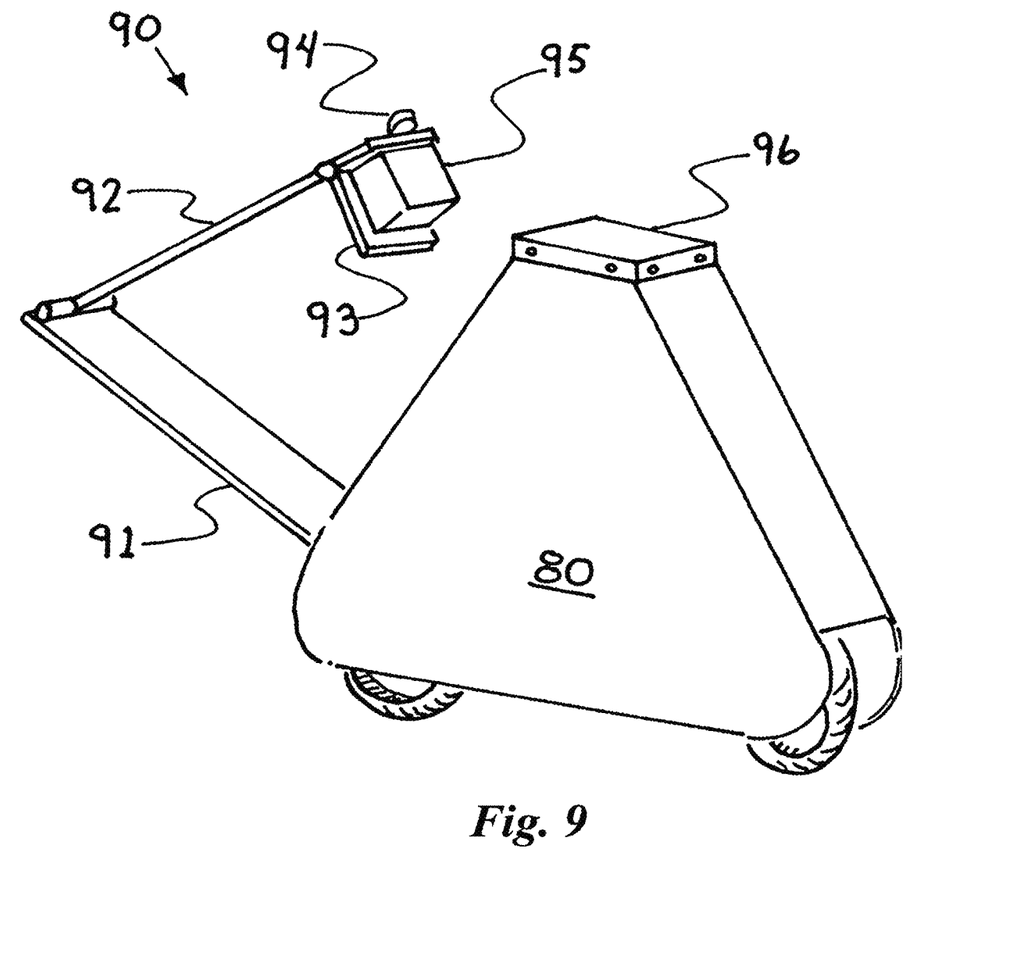
FIG. 9 shows a Twill delivery robot with an integral arm mechanism for loading and unloading.

For applications where self-loading and unloading are required, a variety of embodiments will be fitted with integral arms (90) as seen in FIG. 9. In one preferred embodiment, the first link of an arm (91) is formed by a wall of the enclosure. A second link (92) hinged substantially at the end of the first allows reaching into the hold to select the next package (95) with a gripper (93). This configuration allows reaching up to a second story landing for home delivery. Sensors (94), in particular cameras, may be included on the arm to insure and document proper operation and successful delivery of each package.

(Conveyor)

In other preferred embodiments, an internal conveyor belt is used to dispense packages in a LIFO sequence.

(Doors)

In other preferred embodiments a door or doors may secure internal delivery volumes. Upon arrival to the destination, the appropriate door may be opened remotely presenting the package to the customer. As is common, a user interface or cell phone interface may be provided for communication between the customer and the robot and or between the customer and a remote operator.
(Autonomy Hardware)

FIG. 8 also shows a LIDAR unit (81) on the top which is currently common in experimental self-driving cars. The field is exploding with hardware and software for automatic operation. Twill robots are suitable for all of these technologies. Sensor and computation hardware will also benefit from a modular approach to simplify upgrades and field servicing (96).
(Shorter for Mule Application)

Figure 10:
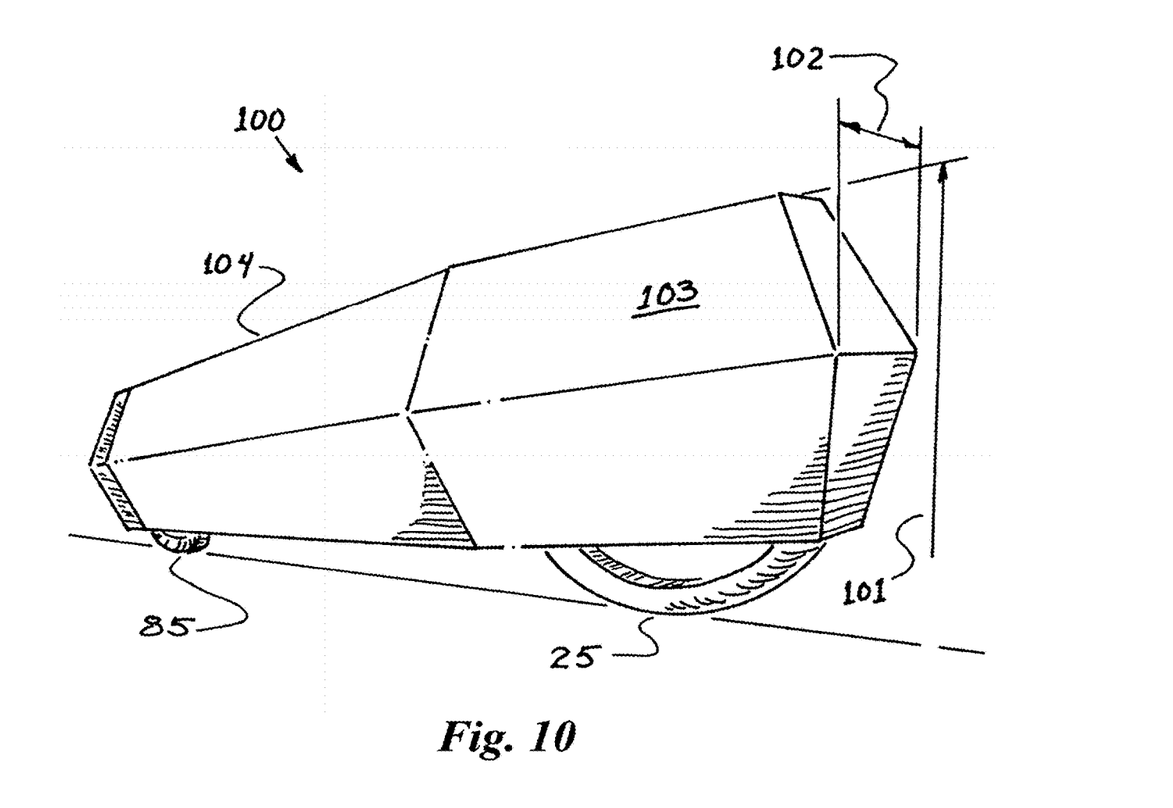
FIG. 10 shows an upward view of a low profile mule robot.

While much has been made of the ability of making twill robots tall, this does not preclude the ability to make short twill robots. One application for this configuration is a military style "mule" (100) for delivering materials as seen in FIG. 10. In this application a Twill mule could be used to deliver materials along trails wherever people walk. The low stance and narrow width (101, 102) would limit the visibility while traveling. Polygonal surfaces (103) would future enhance the stealthy nature of the robot. For manual loading and unloading the top (104) opens for full access to the hold.
(Telescoping Height)

Figure 11:
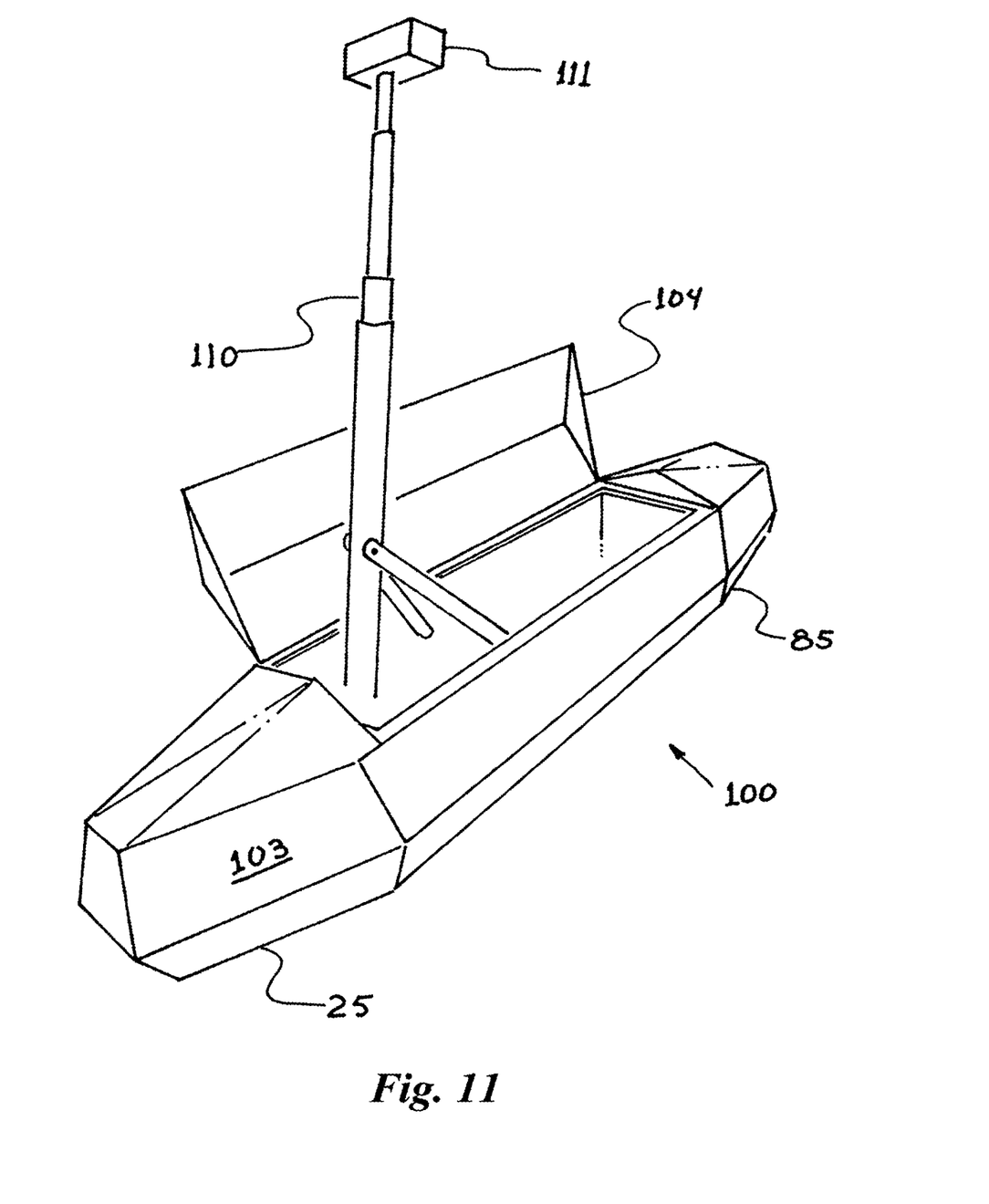
FIG. 11 shows an oblique view of a mule robot deploying a tall sensor array.

In one preferred embodiment, a short Twill mule can navigate to an area of interest. Instead of delivering materials, the payload could be a telescoping device such as but not limited to a camera or antenna (111) as shown in FIG. 11. Taking full advantage of the twill robot agility, a tall surveillance mast (110) may be fully deployed while driving providing a clear view over walls or over a tree line.
(Telepresence Robot)

Figure 12:
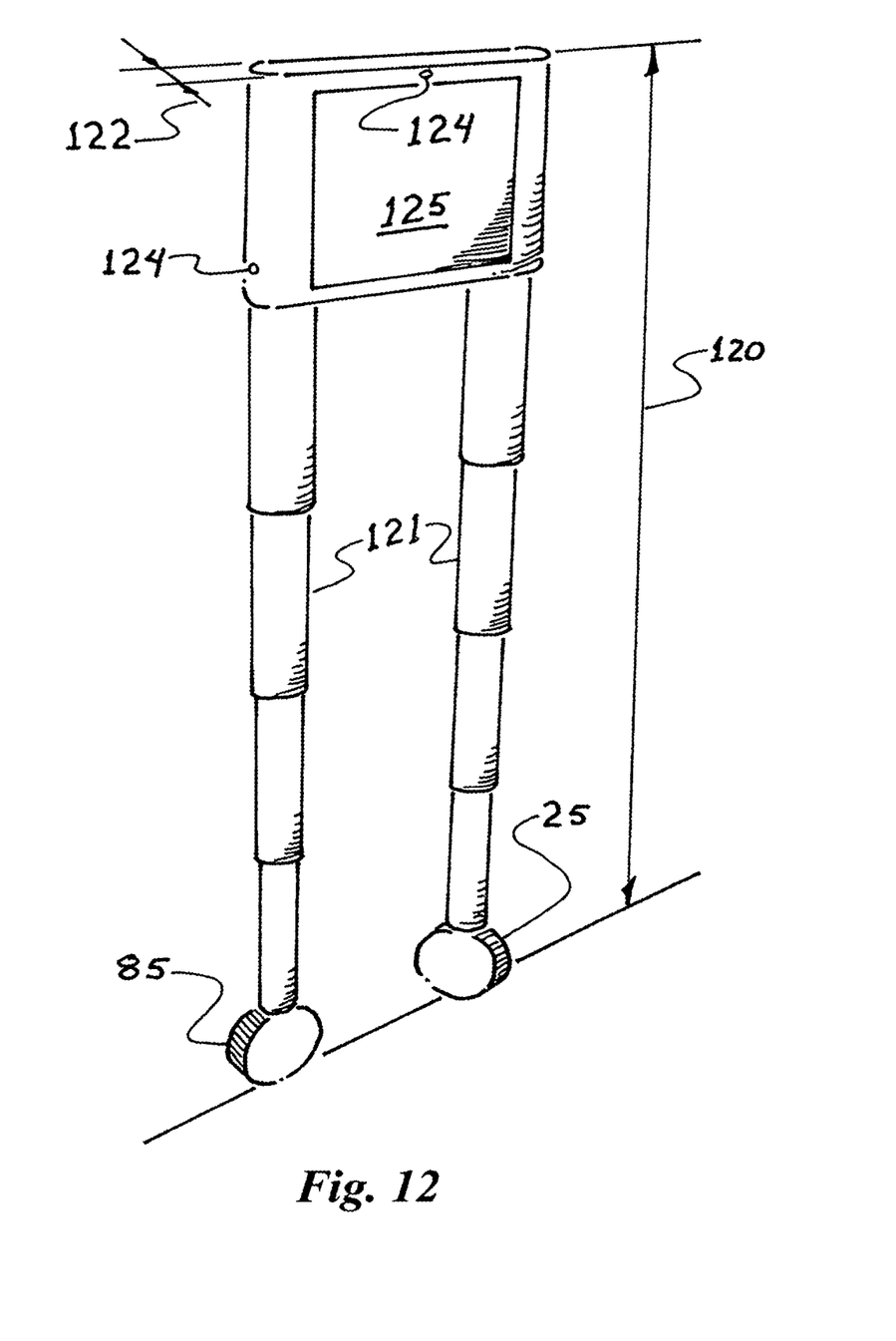
FIG. 12 shows a Twill robot configured as a telescoping telepresence robot.

A natural application of tall skinny Twill robots is for telepresence robots. One preferred embodiment is shown in FIG. 12. This is a growing industry that uses conventional platforms and Segway style platforms. Twill telepresence robots could telescope up and down while in use to adjust conversation height (120). Completely collapsing the legs (121) results in a compact package suitable for convenient shipping to a remote location. The thin package dimension (122) is ideal for sharing space with humans in a hallway. A multiplicity of cameras (124) serve both for navigation and sending video to the remote station. To have a conversation, the telepresence Twill turns to face the audience presenting a full display (125). The other side may have a display also.
(Surveillance Robot)

Another application for tall and skinny twill robots is for automated surveillance robots. This is a market that has been limited by plodding quasi static robotic platforms. Twill surveillance robots mix better with foot traffic, have a vanishingly small frontal profile (to avoid collisions and detection).

CLOSING

It will be clear tone skilled in the art that there are many additional applications for Twill robots.

What we claim is:

1. A robotic device comprising a body to which are mounted:
    (a) a front wheel having a substantially horizontal axis of rotation, a substantially vertical steering axis with a steering angle that is configured to be sensed, said front wheel configured to be driven;
    (b) a rear wheel with a substantially horizontal axis of rotation, said rear wheel configured to be driven;
    (c) an energy source; and
    (d) a control module which stabilizes the roll angle while said robotic device is in one of a forward motion and while stopped;
    wherein said robotic device includes an integral arm for self-loading and unloading.

2. A robotic device comprising a body to which are mounted:
    (a) a front wheel with a substantially horizontal axis of rotation and a substantially vertical steering axis with a steering angle that is configured to be sensed, said front wheel configured to be driven;
    (b) a rear wheel with a substantially horizontal axis of rotation, said rear wheel configured to be driven;
    (c) an energy source; and
    (d) a control module which stabilizes the roll angle while said robotic device is in one of a forward motion and while stopped;
    wherein said robotic device includes a robotic arm for self-loading and self-unloading.

* * * * *